UNITED STATES PATENT OFFICE.

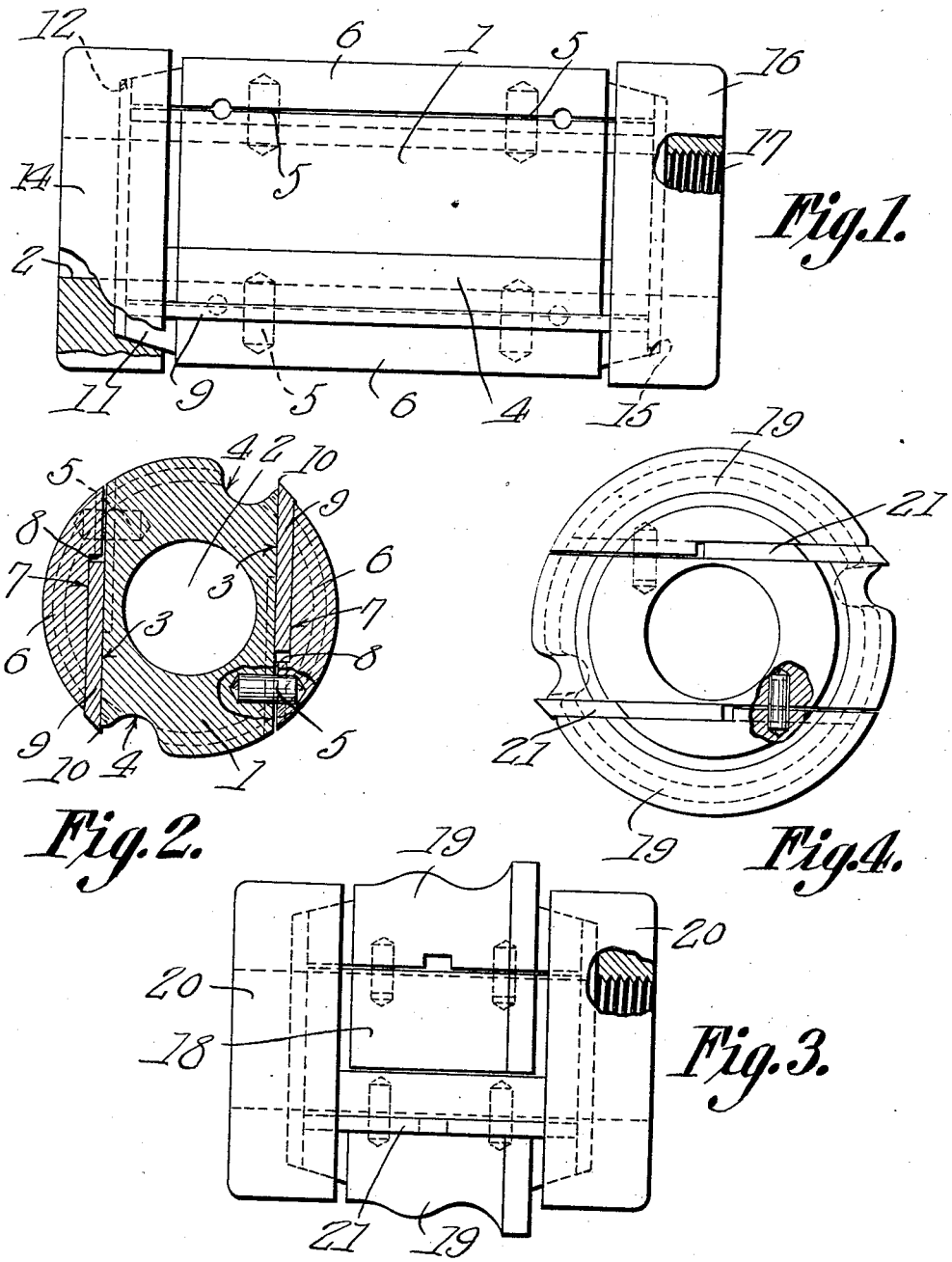

HENRY M. WESTPHAL, OF MANITOWOC, WISCONSIN.

SAFETY SHAPER-HEAD.

1,041,931. Specification of Letters Patent. Patented Oct. 22, 1912.

Application filed June 18, 1912. Serial No. 704,458.

*To all whom it may concern:*

Be it known that I, HENRY M. WESTPHAL, a citizen of the United States, residing at Manitowoc, in the county of Manitowoc and State of Wisconsin, have invented a new and useful Safety Shaper-Head, of which the following is a specification.

The device forming the subject-matter of this application is a cutter head which may readily be placed upon the spindle of any shaping machine, novel means being provided for holding the head upon the spindle, and for causing the blade-clamping jaws to coöperate with the supporting portion of the head.

A further object of the invention is to provide a cutter head of the type above mentioned, which will prevent a severe injury to the operator, should his hand come in contact with the head.

A further object of the invention is to provide a cutter head which will follow the pattern readily and which will make a clean and clear cut in the work.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 shows the invention in side elevation, parts being broken away; Fig. 2 is a transverse section of the structure shown in Fig. 1; Fig. 3 is a side elevation of the head, adapted for use in cutting moldings and the like; and Fig. 4 is an end elevation of the structure shown in Fig. 3, one of the collars being removed.

In carrying out the invention there is provided a support 1 having a central bore 2, the support 1 having parallel, flat, blade-receiving faces 3. Extended longitudinally of the support 1 are superficial chip grooves 4, located, respectively, adjacent the extremities of the blade-receiving faces 3. Projecting from the support 1, adjacent the periphery thereof, are dowels 5, adapted to enter and to hold in place against longitudinal movement, clamping jaws 6. Each jaw 6 is equipped in its inner face with a blade-receiving recess 7, at the extremity of which a shoulder 8 is formed. The blades are indicated at 9, the blades being engaged in the blade-receiving recesses 7 of the jaws 6, and being clamped by the jaws 6, against the blade faces 3 of the support 1. It is to be noted that, as indicated at 10, the cutting edges of the blades 9 project but little beyond the edges of the chip grooves 4, in fact, not more than one-thirty-second of an inch, under ordinary working conditions. Therefore, should the hand of the operator be placed carelessly upon the cutter head, while the same is rotating, no severe injury can be inflicted upon the hand of the operator, owing to the slight protrusion of the cutting edges 10 of the blades 9, beyond the periphery of the support 1.

The ends of the support 1, and the ends of the jaws 6 are tapered as indicated at 11, so as to register in tapered recesses 12–15, formed in the inner faces of collars 14 and 16, respectively. The collar 16, in its interior, is preferably threaded as indicated at 17.

In Figs. 3 and 4, the cutter head is shown as adapted for use in cutting moldings. The structure shown in the figures last above mentioned comprises a support 18, jaws 19, collars 20 and knives or blades 21. No specific description of the structure shown in Figs. 3 and 4 is necessary, beyond the statement that the knives or blades 21, at their cutting edges, are shaped to correspond to the contour of the article which it is desired to produce, the jaws 19, of course, being shaped to conform to the contour of the cutting edges of the blades or knives 21.

In practical operation, the collar 14 is slipped onto the spindle of the machine. The blades 9 are mounted in place between the jaws 6 and the support 1, and the tapered ends 11 of the parts 1 and 6 are introduced into the recess 12 in the collar 14. The collar 16 is then threaded upon the end of the spindle of the machine, the other, tapered ends 11 of the parts 1 and 6 registering in the recess 15 in the collar 16. When the collar 16 is rotated, the cutter head will be mounted securely upon the spindle of the machine, and at the same time, the jaws 6 will be moved transversely of the support 1, so as to engage and grip the blades 9, a transverse movement occurring due to the coöperation between the tapered ends 11 of the parts 1 and 6 upon the one hand, and the recesses 12 and 15 of the collars 14 and 16, respectively, upon the other hand.

As will be understood readily, either of the collars 14 or 16 may be made to follow a pattern, whereby when the cutter head is rotated, the blades 9 will work to form a sinuous or undulated cut in the material. In operation, the projecting edge 10 of the blade 9 is ordinarily disposed flush with the peripheries of the collars 14 and 16. Thus, as either of the collars 14 or 16 rides along the pattern, the blades 9 will cut the material in exact conformity to the pattern.

The device herein disclosed is of few parts, and is simple in operation and in adjustment. It may be assembled readily with any spindle which conforms to the bore 2 of the support 1.

Having thus described the invention, what is claimed is:—

1. In a device of the class described, a support; jaws applied to opposite faces of the support, the jaws and the support being provided with tapered ends; and collars having in their inner faces, conical recesses adapted to receive the tapered ends of the jaws and of the support.

2. In a device of the class described, a support having flat side faces; jaws applied to the flat side faces of the support, the jaws and the support being provided with tapered ends; collars having conical recesses in their inner faces, adapted to receive the tapered ends of the jaws and of the support, the support having an axial bore alined with the openings through the collars, the opening through one collar being threaded.

3. In a device of the class described, a support having flat side faces; jaws applied to the flat side faces of the support and equipped in their inner faces with blade-receiving recesses, there being dowel pins connecting the support and the jaws, beyond the recesses, the jaws and the support being provided with tapered ends; collars having conical recesses in their inner faces, adapted to receive the tapered ends of the support and of the jaws.

In testimony that I claim the foregoing as my own, I have hereto affixed my signature in the presence of two witnesses.

HENRY M. WESTPHAL.

Witnesses:
F. J. KUNZ,
W. F. ZEMAN.

---

Copies of this patent may be obtained for five cents each, by addressing the "Commissioner of Patents, Washington, D. C."